US011150456B2

(12) United States Patent
Hirata (10) Patent No.: US 11,150,456 B2
(45) Date of Patent: Oct. 19, 2021

(54) OBSERVATION APPARATUS (71) Applicant: OLYMPUS CORPORATION, Tokyo (JP)

(72) Inventor: Tadashi Hirata, Tokyo (JP)

(73) Assignee: OLYMPUS CORPORATION, Tokyo (JP)

( * ) Notice: Subject to any disclaimer, the term of this patent is extended or adjusted under 35 U.S.C. 154(b) by 342 days.

(21) Appl. No.: 16/284,071

(22) Filed: Feb. 25, 2019

(65) Prior Publication Data

US 2019/0187451 A1 Jun. 20, 2019

Related U.S. Application Data (63) Continuation of application No. PCT/JP2016/076204, filed on Sep. 6, 2016.

(51) Int. Cl.
*G02B 21/06* (2006.01)
*G02B 21/00* (2006.01)
(Continued)

(52) U.S. Cl.
CPC ............ *G02B 21/084* (2013.01); *G02B 3/08* (2013.01); *G02B 21/06* (2013.01); *G02B 21/088* (2013.01);
(Continued)

(58) Field of Classification Search
CPC ... G02B 3/08; G02B 5/00; G02B 5/02; G02B 5/021; G02B 5/0221; G02B 21/00;
(Continued)

(56) References Cited

U.S. PATENT DOCUMENTS 5,751,475 A 5/1998 Ishiwata et al.
6,674,575 B1 * 1/2004 Tandler ................. G02B 21/06
359/368

(Continued)

FOREIGN PATENT DOCUMENTS

EP 3211469 A1 8/2017
EP 3279713 A1 2/2018
(Continued)

OTHER PUBLICATIONS

Chinese Office Action dated Aug. 28, 2020 in Chinese Patent Application No. 201680088537.5.
(Continued)

*Primary Examiner* — Thong Q Nguyen
(74) *Attorney, Agent, or Firm* — Scully, Scott, Murphy & Presser, P.C.

(57) ABSTRACT

An observation apparatus includes: a stage on which a container accommodating a specimen is mounted; a light source generating illumination light emitted in an upward direction from below the specimen on a specimen placement surface; a light-collecting lens disposed parallel to the surface and collecting the light; a diffusion plate disposed between the lens and the surface, parallel to the surface, and diffusing the light collected by the lens; an objective optical system disposed below the stage and collecting light passing through the stage from thereabove; and an image-capturing optical system capturing, below the specimen, transmitted light, which is the light emitted from the source, reflected above the specimen, transmitted through the specimen, and collected by the objective optical system, wherein the source is positioned so that an optical axis thereof is shifted from an optical axis of the lens in a direction away from the image-capturing optical system.

10 Claims, 12 Drawing Sheets (51) Int. Cl.
  *G02B 21/08*  (2006.01)
  *G03B 15/02*  (2021.01)
  *G02B 3/08*   (2006.01)
  *G02B 21/26*  (2006.01)
  *G02B 21/36*  (2006.01)

(52) U.S. Cl.
  CPC ........... *G02B 21/26* (2013.01); *G02B 21/361* (2013.01); *G03B 15/02* (2013.01)

(58) Field of Classification Search
  CPC .... G02B 21/0032; G02B 21/06; G02B 21/08; G02B 21/084; G02B 21/088; G02B 21/26; G02B 21/34; G02B 21/361
  USPC .......................... 359/368, 385, 391, 398, 599
  See application file for complete search history.

(56) References Cited

U.S. PATENT DOCUMENTS

| | | | | |
|---|---|---|---|---|
| 7,397,601 | B2* | 7/2008 | Laudo | B01L 9/06 359/368 |
| 10,877,256 | B2* | 12/2020 | Hirata | G02B 21/24 |
| 2001/0012393 | A1* | 8/2001 | Yonezawa | G01N 21/8803 382/145 |
| 2009/0251751 | A1* | 10/2009 | Kuhlmann | G02B 27/1006 359/15 |
| 2014/0333997 | A1 | 11/2014 | Oda | |
| 2017/0261732 | A1 | 9/2017 | Takahashi et al. | |
| 2017/0355949 | A1 | 12/2017 | Hirata et al. | |
| 2018/0267285 | A1 | 9/2018 | Hirata et al. | |

FOREIGN PATENT DOCUMENTS

| | | |
|---|---|---|
| JP | H02232614 A | 9/1990 |
| JP | H07174978 A | 7/1995 |
| JP | H07261089 A | 10/1995 |
| JP | 2006-174764 A | 7/2006 |
| JP | 2010257585 A | 11/2010 |
| JP | 2011008188 A | 1/2011 |
| WO | 2013094434 A1 | 6/2013 |
| WO | 2016158780 A1 | 10/2016 |
| WO | 2016158782 A1 | 10/2016 |
| WO | 2017104068 A1 | 6/2017 |

OTHER PUBLICATIONS

International Search Report dated Oct. 11, 2016 issued in PCT/JP2016/076204.

* cited by examiner

DIRECTION IN WHICH ILLUMINATION LIGHT IS INCLINED

LIGHT INTENSITY DISTRIBUTION ON DIFFUSION PLATE

OBSERVATION APPARATUS

CROSS-REFERENCE TO RELATED APPLICATIONS

This is a continuation of International Application PCT/JP2016/076204 which is hereby incorporated by reference herein in its entirety.

TECHNICAL FIELD

The present invention relates to an observation apparatus.

BACKGROUND ART

In the related art, as an apparatus for observing an imaging subject, such as cells, without labeling, there is a known observation apparatus employing a phase difference observation method or a differential interference observation method (for example, see Patent Literature 1).

CITATION LIST

Patent Literature

{PTL 1} Japanese Unexamined Patent Application, Publication No. Hei 7-261089

SUMMARY OF INVENTION

An aspect of the present invention is an observation apparatus provided with: a stage on which a container accommodating a specimen is mounted; a light source that generate illumination light emitted in an upward direction from below the specimen placed on a specimen placement surface; a light-collecting lens that is disposed parallel to the specimen placement surface and that collects the illumination light emitted from the light source; a diffusion plate that is disposed between the light-collecting lens and the specimen placement surface, parallel to the specimen placement surface, and that diffuses the illumination light collected by the light-collecting lens; an objective optical system that is disposed below the stage and that collects light passing through the stage from thereabove; and an image-capturing optical system that captures, below the specimen, transmitted light, which is the illumination light that has been emitted from the light source, reflected above the specimen, transmitted through the specimen, and collected by the objective optical system, wherein the light source is positioned so that an optical axis thereof is shifted from an optical axis of the light-collecting lens in a direction away from the image-capturing optical system.

DESCRIPTION OF EMBODIMENTS

First Embodiment

An observation apparatus 1 according to a first embodiment of the present invention will be described below with reference to the drawings.

Figure 1:
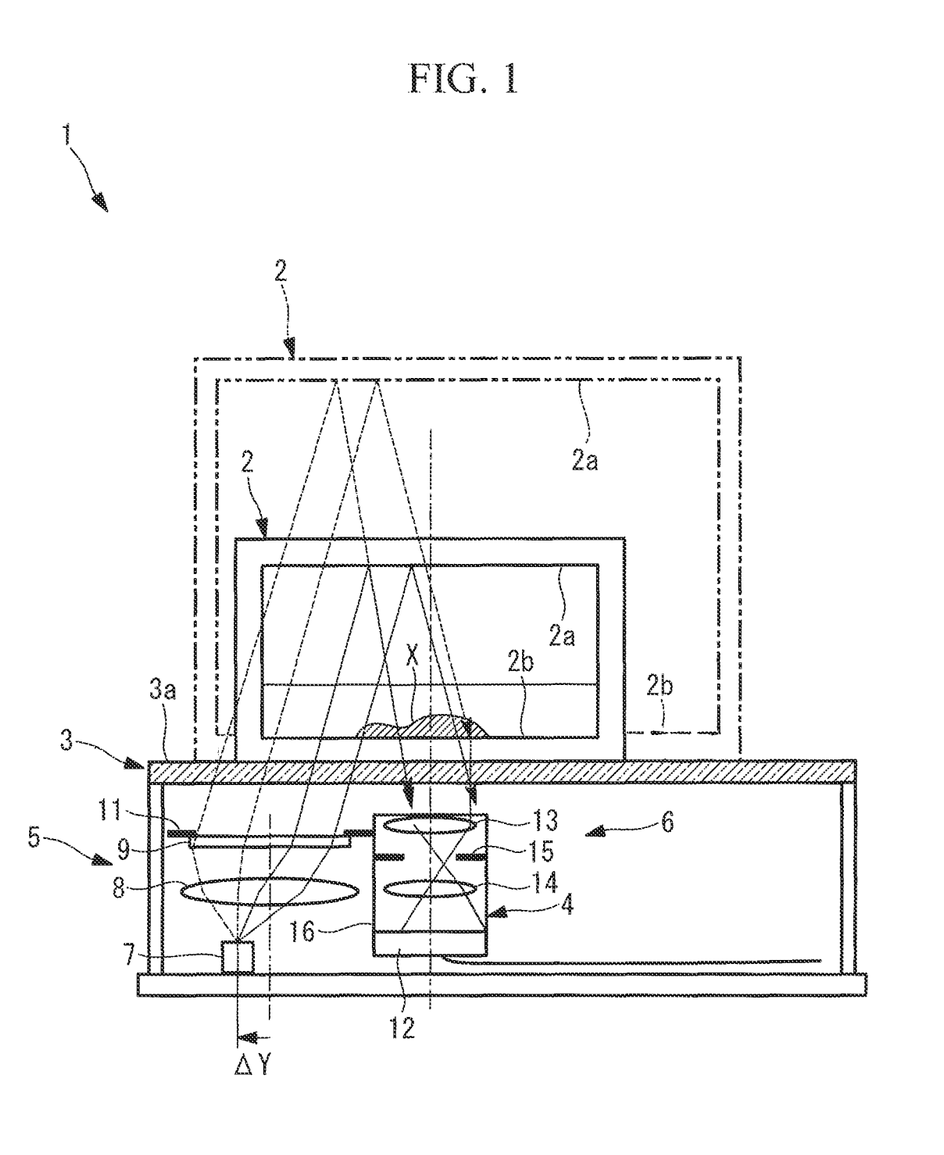
FIG. 1 is a longitudinal cross-sectional view of an observation apparatus according to a first embodiment of the present invention.

As shown in FIG. 1, the observation apparatus 1 according to this embodiment is provided with: a stage 3 on which a container 2 accommodating a specimen X is mounted; an objective optical system 4 that is disposed below the stage 3 and that collects light passing through the stage 3 from thereabove; an image-capturing optical system 6 that captures the light that has passed through the specimen X and that has been collected by the objective optical system 4 therein; and a light source portion 5 that is disposed radially outside the objective optical system 4 and that emits illumination light upward so as to pass through the stage 3.

The stage 3 is provided with an optically transparent material, for example, a glass plate 3a, which is horizontally disposed so as to cover upper portions of the objective optical system 4 and the light source portion 5.

The container 2 is, for example, a cell culturing flask having a top plate 2a that reflects light and a bottom surface (specimen placement surface) 2b on which the specimen X is placed, and is composed of an optically transparent resin in the entirety thereof. In this container 2, the top plate 2a and the bottom surface 2b are parallel to each other, and the top plate 2a and the bottom surface 2b are horizontally disposed in a state in which the container 2 is mounted on the glass plate 3a of the stage 3.

The light source portion 5 is provided with: an LED light source 7 that generates illumination light; a light-collecting lens 8 that collects the illumination light emitted from the LED light source 7; and a diffusion plate 9 that diffuses the illumination light collected by the light-collecting lens 8. The light-collecting lens 8 and the diffusion plate 9 are individually disposed parallel to the bottom surface 2b of the container 2, with a gap therebetween in a direction along the optical axis.

The LED light source 7 is positioned so that the optical axis thereof is parallel to the optical axis of the light-collecting lens 8 and so that the optical axis thereof is shifted from the optical axis of the light-collecting lens 8 in a direction away from the objective optical system 4. By doing so, the illumination light that has entered the light-collecting lens 8 from the LED light source 7 is made to be emitted, by means of the light-collecting lens 8, with an inclination toward the objective optical system 4.

It is desirable that the LED light source 7 be positioned so as to satisfy, for example, Conditional Expression (1).

$$0.5 < \Delta Y/(NA \times FI) < 1.5 \quad (1)$$

Furthermore, it is more desirable that the position of the LED light source 7 satisfy Conditional Expression (1').

$$\Delta Y = NA \times FI \quad (1')$$

Here, $\Delta Y$ is the center position of the light-emitting region of the LED light source 7 with respect to the optical axis of the light-collecting lens 8; NA is the numerical aperture of the objective optical system 4; and FI is the focal distance of the light-collecting lens 8.

The illumination light emitted from the diffusion plate 9 has an angular distribution. With this configuration, the illumination light flux enters a pupil plane of the objective optical system 4 in the form of a plane instead of a point, and thus, it is possible to enhance the robustness against angle variations at the top plate 2a of the container 2. The diffusion plate 9 is provided with an illumination mask 11 that limits the emission region for emitting the illumination light from the LED light source 7.

The image-capturing optical system 6 is provided with, in addition to the objective optical system 4: an image-acquisition element 12 that captures the transmitted light collected by the objective optical system 4; and, for example, a processor (not shown) that generates an image from information for the transmitted light captured by the image-acquisition element 12.

The objective optical system 4 is provided with: a distal end lens 13 that is disposed at a distal end thereof; a proximal end lens 14 that is disposed on the proximal end side with respect to the distal end lens 13, with a gap therebetween in a direction along the optical axis; a pupil (aperture stop) 15 that is disposed on the optical axis between the distal end lens 13 and the proximal end lens 14; and a frame 16 that accommodates these components.

The operation of the thus-configured observation apparatus 1 according to this embodiment will be described below.

In a case in which a transparent specimen X, such as cells, accommodated in the container 2 is observed by using the observation apparatus 1 according to this embodiment, as shown in FIG. 1, in a state in which the specimen X is accommodated in the container 2 and adhered on the bottom surface 2b, the container 2 is mounted on the glass plate 3a of the stage 3 such that the bottom surface 2b is set to be the lower side.

In this state, the LED light source 7 is activated to generate illumination light. In this case, by positioning the LED light source 7 so that the optical axis thereof is shifted from the optical axis of the light-collecting lens 8 in the direction away from the image-capturing optical system 6, the illumination light emitted from the LED light source 7 is collected by the light-collecting lens 8 and is emitted, with an inclination toward the objective optical system 4. Then, the illumination light emitted from the light-collecting lens 8 is uniformly diffused by the diffusion plate 9; passes through the glass plate 3a and the bottom surface 2b of the container 2 in an upward direction; is reflected above the specimen X, at an inner surface of the top plate 2a of the container 2; and is radiated onto the specimen X obliquely from above.

Of the illumination light radiated onto the specimen X, the transmitted light that has passed through the specimen X passes through the bottom surface 2b of the container 2 and the glass plate 3a in a downward direction, and obliquely enters the objective optical system 4, with an angle relative to the optical axis thereof. At this time, the illumination light is refracted and scattered due to the shape or refractive index of the specimen X, or is attenuated due to the transmittance of the specimen X, whereby the transmitted light having information about the specimen X is collected by the objective optical system 4 and captured by the image-acquisition element 12.

Figure 2:
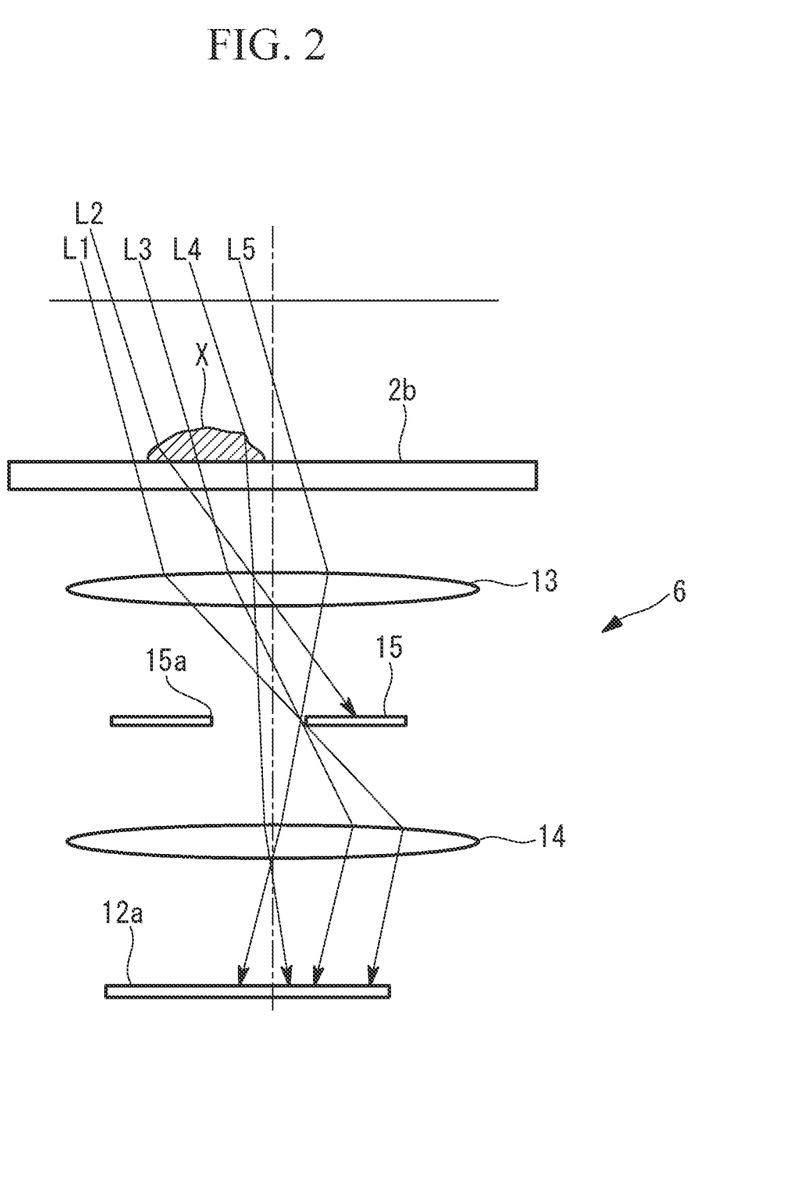
FIG. 2 is a diagram showing an example of trajectories for individual positions through which illumination light passes in an objective optical system in FIG. 1.
Figure 3:
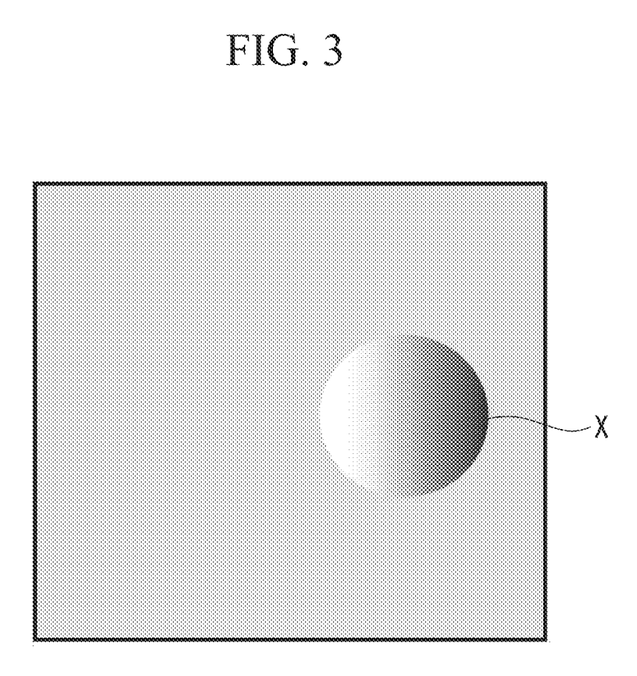
FIG. 3 is a diagram showing an example of a specimen that appears in a stereoscopic manner by means of oblique illumination.

Here, the transmitted light passing outside of the pupil 15 is blocked in the objective optical system 4. As shown in FIG. 2, in a case in which the incident angle of the illumination light in the objective optical system 4 is equal to the acceptance angle of the objective optical system 4, illumination light beams L1, L5 that do not pass through the specimen X pass near an edge portion 15a of the pupil 15 and reach an image surface 12a. In addition, an illumination light beam L2 that has passed through the left end of the specimen X is refracted at the specimen X and reaches an area outside the pupil 15; thus, the illumination light beam L2 is blocked and does not reach the image surface 12a. In addition, an illumination light beam L3 that has passed through the center portion of the specimen X and an illumination light beam L4 that has passed through the right side of the specimen X are refracted at the specimen X, pass inside of the edge portion 15a of the pupil 15, and reach the image surface 12a. As a result, as shown in FIG. 3, the specimen X is shaded and appears in a stereoscopic manner.

Therefore, with the observation apparatus 1 according to this embodiment, it is possible to efficiently illuminate the specimen X at an oblique illumination angle that allows a stereoscopic view of the specimen X, and it is possible to suppress the occurrence of illumination nonuniformity. In particular, by satisfying Conditional Expression (1), more preferably, Conditional Expression (1'), it is possible to illuminate the specimen X at an optimum oblique illumination angle. In addition, by arranging the bottom surface 2b on which the specimen X is placed, the light-collecting lens 8, and the diffusion plate 9 so as to be parallel to each other, it is possible to reduce the thickness of the apparatus. By doing so, it is possible to efficiently illuminate the specimen X and to observe the specimen X in a stereoscopic and highly precise manner by means of oblique illumination, without increasing the size of the apparatus. In addition, the number of components is decreased, and thus, it is possible to reduce the cost.

Note that, in a case in which the position of the LED light source 7 does not satisfy Conditional Expressions (1) and (1'), the angle of the illumination light entering the diffusion plate 9 significantly deviates from the conditions for oblique illumination. In the case in which Conditional Expressions (1) and (1') are not satisfied, it is necessary to widen the angular distribution of the light emitted from the diffusion plate 9, by using a diffusion plate 9 having a large diffusion angle, so that the illumination light emitted from the diffusion plate 9 satisfies the conditions for oblique illumination, and this would decrease the illumination efficiency.

Second Embodiment

Next, an observation apparatus according to a second embodiment of the present invention will be described below with reference to the drawings.

Figure 4:
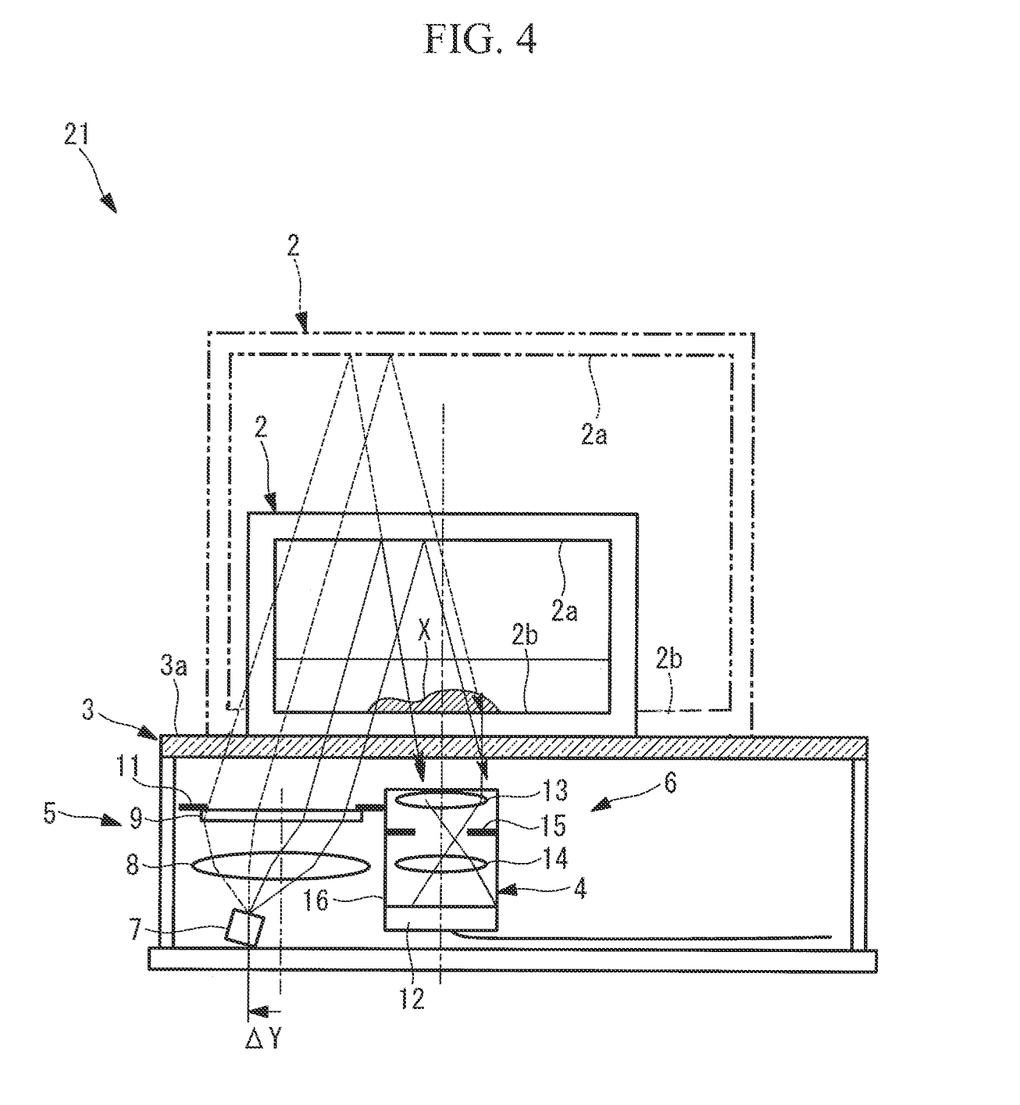
FIG. 4 is a longitudinal cross-sectional view of an observation apparatus according to a second embodiment of the present invention.

As shown in FIG. 4, an observation apparatus 21 according to this embodiment differs from that in the first embodiment in that the LED light source 7 is disposed in such a manner that the optical axis thereof is tilted toward the image-capturing optical system 6.

In the description of this embodiment, parts having the same configuration as those in the observation apparatus 1 according to the abovementioned first embodiment will be assigned the same reference signs, and descriptions thereof will be omitted.

In the observation apparatus 21 according to this embodiment, the basic configuration is the same as that of the observation apparatus 1 according to the first embodiment, except that the LED light source 7 is disposed with the optical axis thereof being tilted.

By positioning the LED light source 7 in such a manner that the optical axis thereof is tilted toward the image-capturing optical system 6, the illumination light is emitted from the LED light source 7 toward the image-capturing optical system 6 more intensely, and it is possible to suppress the loss of the illumination light, thereby enhancing the illumination efficiency.

Here, the shape of the illumination mask 11 of the observation apparatus 21 according to this embodiment will be described.

Figure 5:
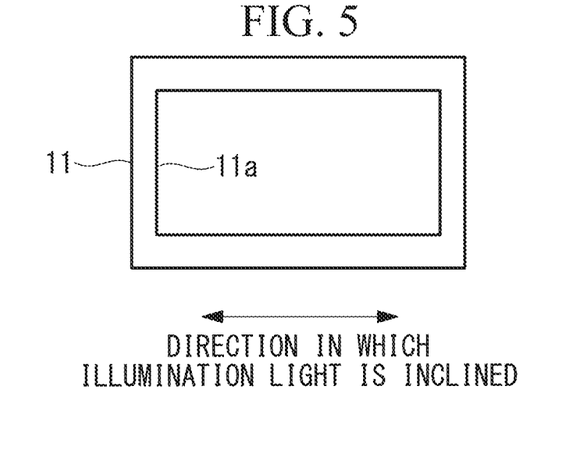
FIG. 5 is a plan view of an illumination mask, an inner edge portion of which has a rectangular shape, as viewed in a direction along an optical axis of a light-collecting lens.

As shown in FIG. 5, for example, it is desirable that an inner edge portion 11a of the illumination mask 11, which allows the illumination light to pass therethrough, have a rectangular shape.

By doing so, the refraction of the transmitted light beams at the specimen X becomes proportional to the shift of the illumination light flux at the pupil plane of the objective optical system 4. In addition, in a case in which the inner edge portion 11a of the illumination mask 11 has a circular shape, the brightness change on the image surface (proportional to the area of the illumination light flux at the pupil) does not show linearity, whereas the brightness change on the image surface becomes close to linear by forming the inner edge portion 11a of the illumination mask 11 into a rectangular shape. In addition, by forming the inner edge portion 11a of the illumination mask 11 into a rectangular shape, it is possible to employ the illumination mask 11 for containers 2 with various heights.

Figure 6A:
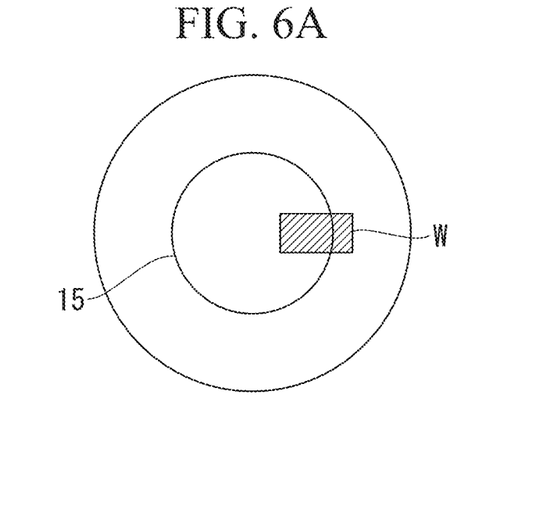
FIG. 6A is a diagram showing an example of the illumination light flux at the pupil plane of the objective optical system in a case in which the height of a top plate of a container is high.
Figure 6B:
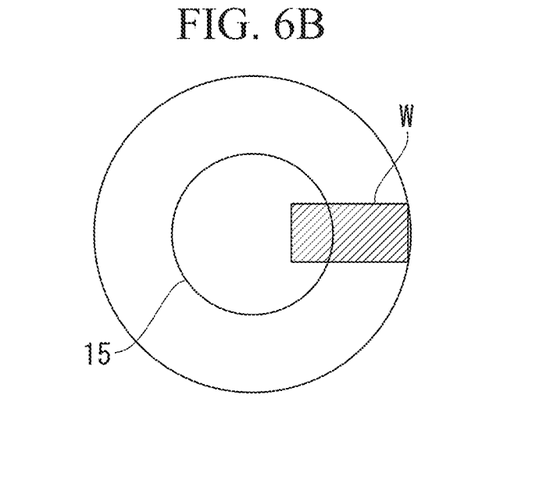
FIG. 6B is a diagram showing an example of the illumination light flux at the pupil plane of the objective optical system in a case in which the height of the top plate of the container is low.

FIG. 6A shows the illumination light flux W at the pupil plane of the objective optical system 4 in a case in which the height of the top plate 2a of the container 2 is high, and FIG. 6B shows the illumination light flux W at the pupil plane of the objective optical system 4 in a case in which the height of the top plate 2a of the container 2 is low.

Figure 7:
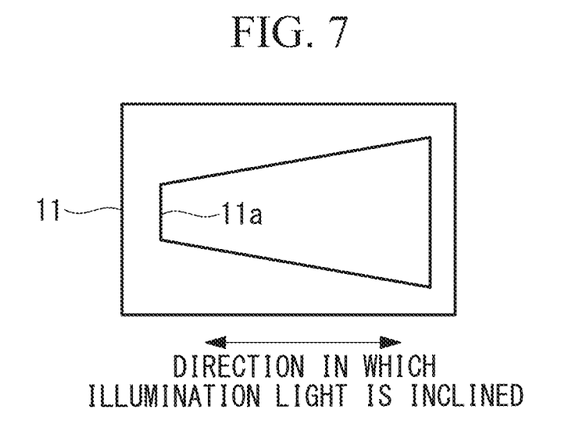
FIG. 7 is a plan view of an illumination mask, an inner edge portion of which has a trapezoidal shape, as viewed in the direction along the optical axis of the light-collecting lens.

Furthermore, as shown in FIG. 7, it is more desirable that the inner edge portion 11a of the illumination mask 11 have a trapezoidal shape, in which a short side thereof corresponds to the objective optical system 4 side. By doing so, the refraction of the transmitted light beams at the specimen X becomes proportional to the shift of the illumination light flux at the pupil plane of the objective optical system 4. In addition, the brightness change on the image surface increases as compared to the case in which the inner edge portion 11a of the illumination mask 11 has a rectangular shape, and it is possible to improve the contrast.

Figure 8:
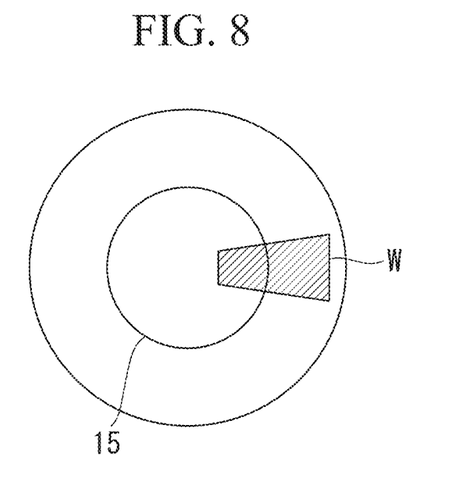
FIG. 8 is a diagram showing the illumination light flux at the pupil plane of the objective optical system in the case in which the inner edge portion of the illumination mask has a trapezoidal shape, in which a short side thereof corresponds to the objective-optical-system side.

FIG. 8 shows the illumination light flux W at the pupil plane of the objective optical system 4 in a case in which the illumination mask 11 the inner edge portion 11a of which has a trapezoidal shape wherein a short side thereof corresponds to the objective optical system 4 side is used.

Next, the diffusion characteristics of the observation apparatus 21 according to this embodiment will be described.

Figure 9:
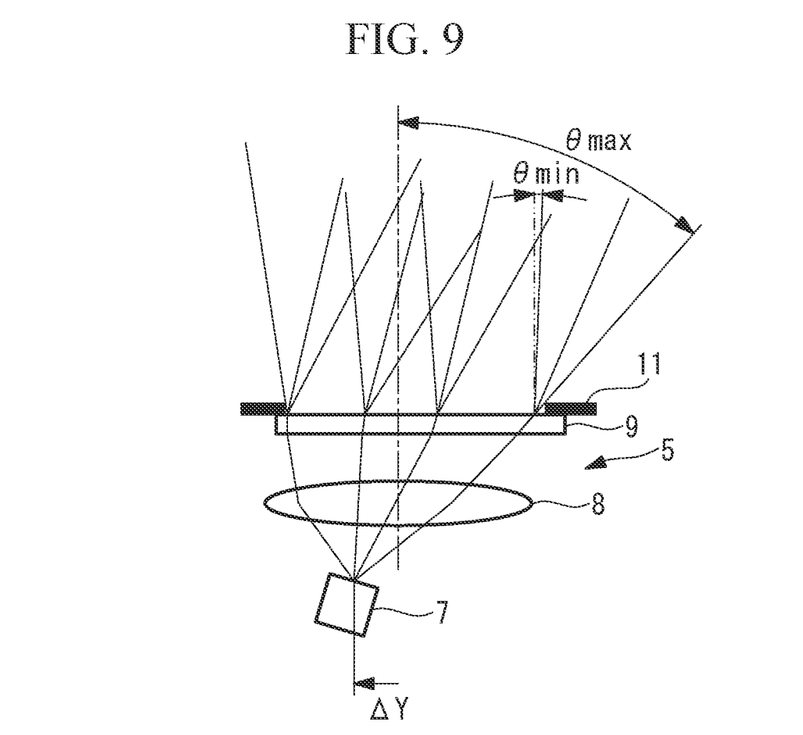
FIG. 9 is a diagram showing an example of the diffusion distribution of the illumination light emitted from a diffusion plate of the observation apparatus in FIG. 4.
Figure 10:
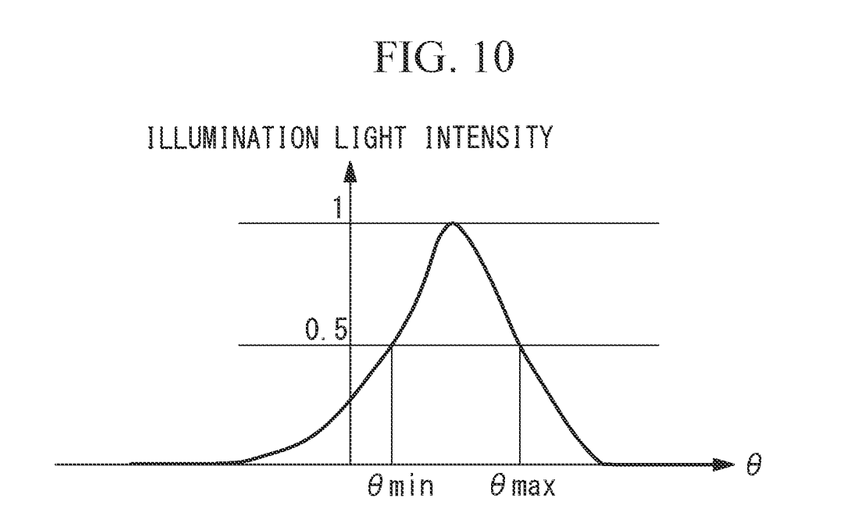
FIG. 10 is a graph showing the relationship between the intensity of the illumination light and an angle, relative to an optical axis of the objective optical system, at which the intensity is at least half the peak intensity of the illumination light diffused by the diffusion plate.

As shown in FIGS. 9 and 10, it is desirable that the angular distribution of the illumination light emitted from the diffusion plate 9 satisfy Conditional Expressions (2) and (3).

$$\theta min/NA<0.5 \qquad (2)$$

$$\theta max/NA>2 \qquad (3)$$

Here, NA is the numerical aperture of the objective optical system 4; θ min is the minimum value of the angle, relative to the optical axis of the objective optical system 4, at which the intensity is at least half the peak intensity of the illumination light diffused by the diffusion plate 9; and θ max is the maximum value of the angle, relative to the optical axis of the objective optical system 4, at which the intensity is at least half the peak intensity of the illumination light diffused by the diffusion plate 9.

When the angular distribution of the illumination light emitted from the diffusion plate 9 satisfies Conditional Expressions (2) and (3), it is possible to efficiently radiate the illumination light onto the specimen X at an optimum oblique illumination angle, and it is possible to suppress the occurrence of illumination nonuniformity. In addition, the number of components is decreased, and thus, it is possible to reduce the cost. Furthermore, it is possible to enhance the robustness against shape errors of the container 2.

Note that, in a case in which the angular distribution of the illumination light emitted from the diffusion plate 9 does not satisfy Conditional Expressions (2) and (3), if the top plate 2a of the container 2 is inclined due to a shape error, the illumination light deviates from the conditions for oblique illumination, thereby decreasing the contrast and the illumination efficiency.

Next, the positions of the LED light source 7 and the light-collecting lens 8 in the height direction will be described.

The height of the LED light source 7 with respect to the light-collecting lens 8 needs to satisfy Conditional Expression (5).

$$-0.5 < \Delta Z/FI < 0.5 \qquad (5)$$

Here, $\Delta Z$ is the height deviation of the LED light source 7 with respect to the focal plane of the light-collecting lens 8, and FI is the focal distance of the light-collecting lens 8.

Figure 11:
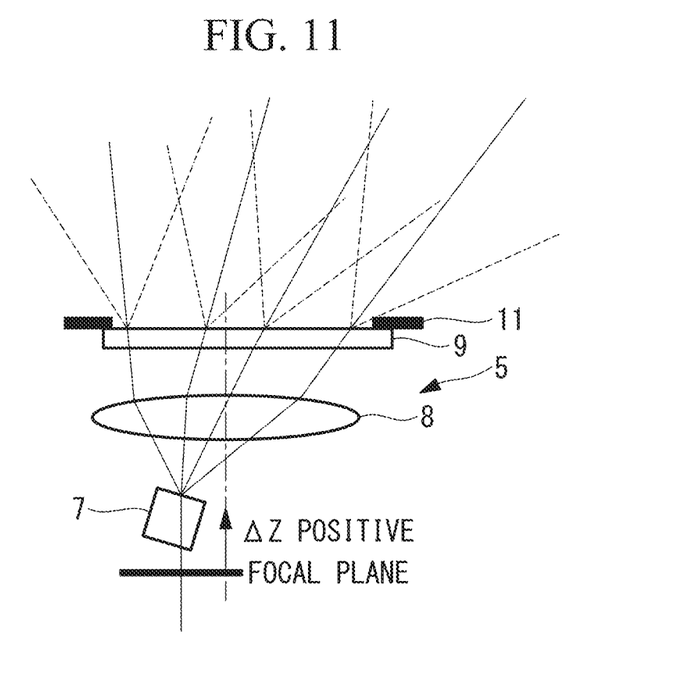
FIG. 11 is a diagram showing a state in which the illumination light is emitted from the diffusion plate in a diverging manner.
Figure 12:
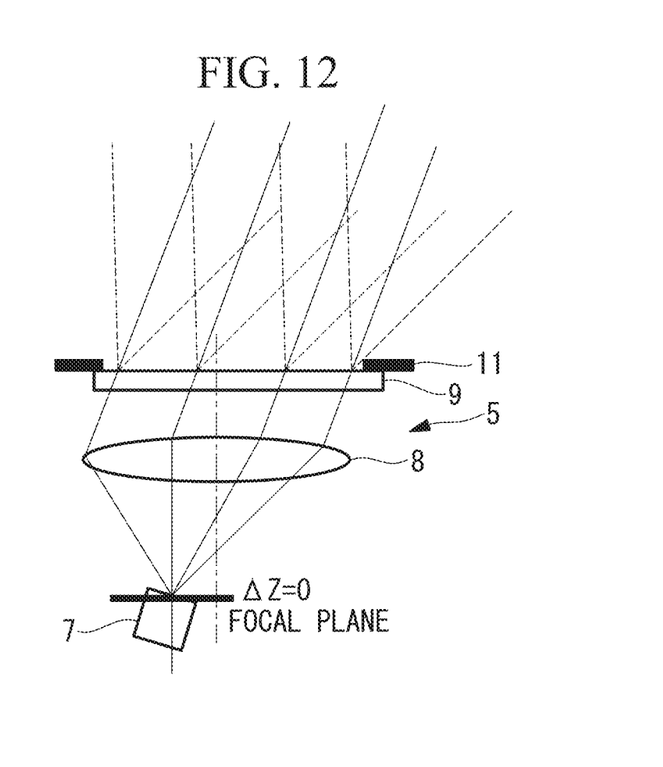
FIG. 12 is a diagram showing a state in which the illumination light is emitted from the diffusion plate in a collimated manner.
Figure 13:
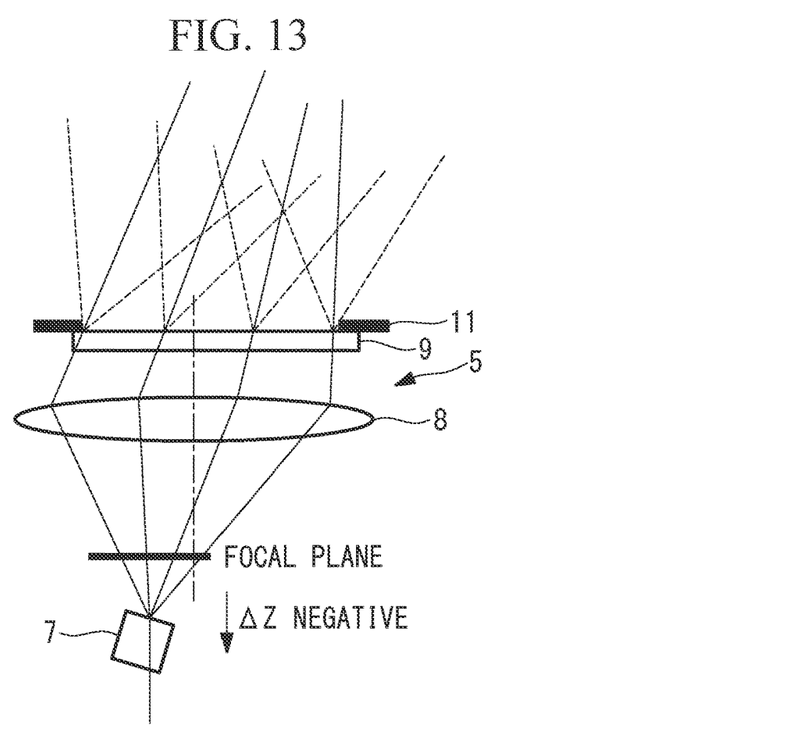
FIG. 13 is a diagram showing a state in which the illumination light is emitted from the diffusion plate in a converging manner.

At the diffusion plate 9, the illumination light is emitted in a diverging manner, as shown in FIG. 11, when $\Delta Z$ is a positive value; the illumination light is emitted in a collimated manner, as shown in FIG. 12, when $\Delta Z=0$; and the illumination light is emitted in a converging manner, as shown in FIG. 13, when $\Delta Z$ is a negative value.

When the height of the LED light source 7 with respect to the light-collecting lens 8 satisfies Conditional Expression (5), the angular characteristics of the illumination light diffused by the diffusion plate 9 become equal at each position on the diffusion plate 9. Therefore, even if a diffusion plate 9 having a small amount of diffusion is used, it is possible to realize a configuration that satisfies the abovementioned Conditional Expressions (2) and (3), and thus, it is possible to enhance the illumination efficiency.

On the other hand, in a case in which the height of the LED light source 7 with respect to the light-collecting lens 8 does not satisfy Conditional Expression (5), the scattering angle of the illumination light diffused at the diffusion plate 9 significantly varies depending on the position on the diffusion plate 9, and brightness nonuniformity occurs when the specimen X is observed. In order to suppress this problem, it is necessary to employ a diffusion plate 9 having a large amount of diffusion, and this would decrease the illumination efficiency.

This embodiment can be modified as described below.

Figure 14:
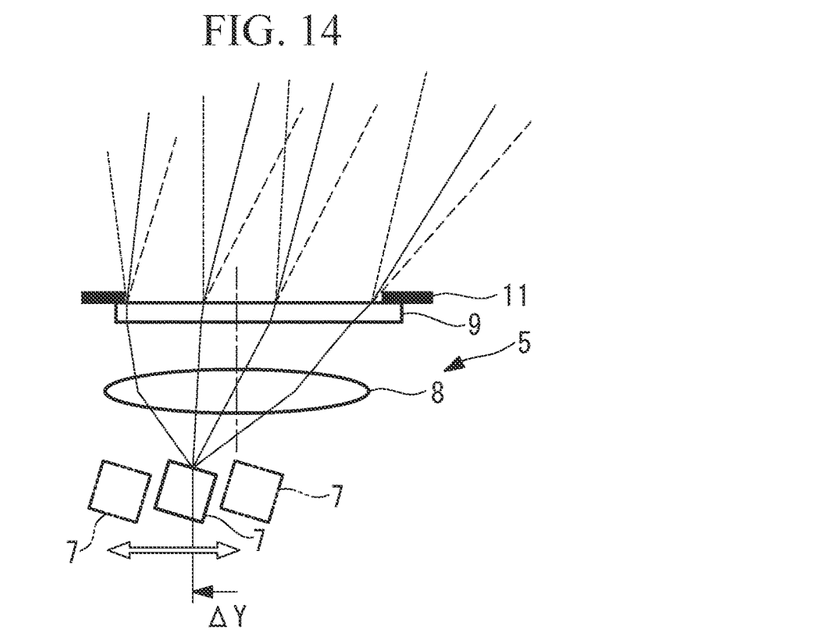
FIG. 14 is a diagram showing a state in which an LED light source is moved in a horizontal direction in an observation apparatus according to a first modification of the second embodiment of the present invention.

As shown in FIG. 14, for example, a first modification may be provided with a drive mechanism (illumination-system drive mechanism, not shown) that moves the LED light source 7 in a horizontal direction. In FIG. 14, $\Delta Y$ indicates the moving amount of the LED light source 7.

By moving the LED light source 7 in the horizontal direction by means of the drive mechanism, it is possible to change the emission angle of the illumination light emitted from the diffusion plate 9. Therefore, it is possible to set the emission angle of the illumination light emitted from the diffusion plate 9 to an efficient angle in accordance with the NA of the objective optical system 4 or the inclination of the top plate 2a of the container 2.

Figure 15:
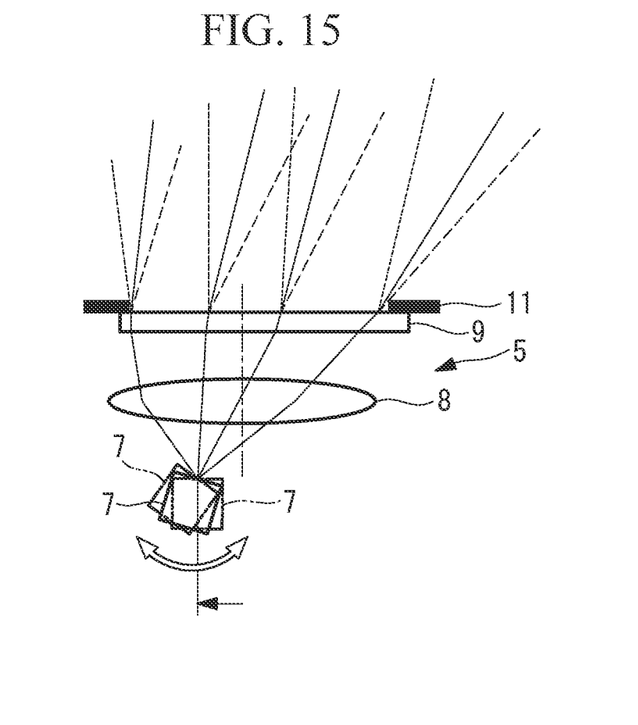
FIG. 15 is a diagram showing a state in which the inclination angle of an LED light source is changed, in an observation apparatus according to a second modification of the second embodiment of the present invention.
Figure 16:
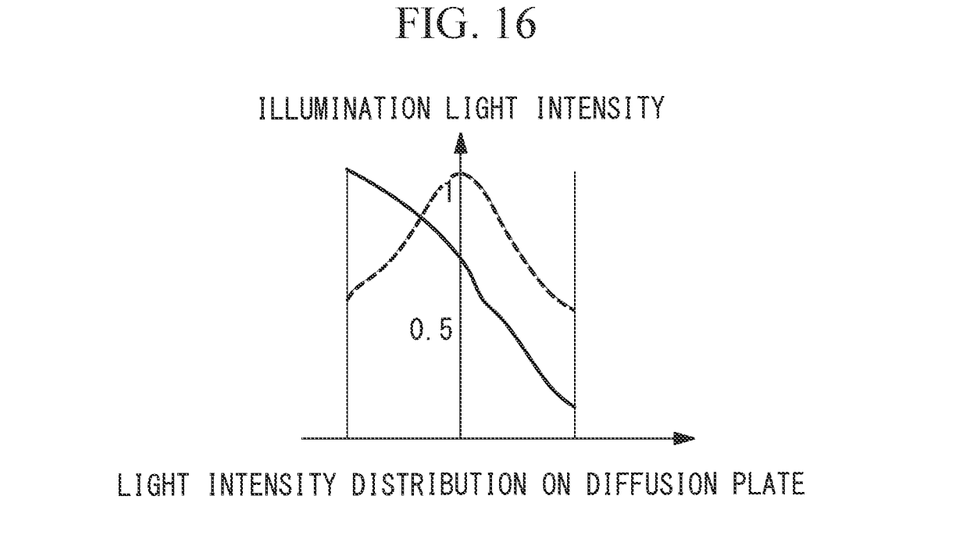
FIG. 16 is a graph showing the relationship between the light intensity distribution on the diffusion plate and the intensity of the illumination light.
Figure 17:
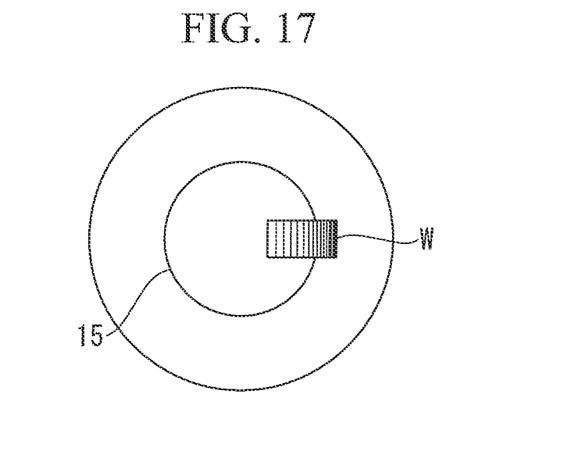
FIG. 17 is a diagram showing an example of the illumination light flux at the pupil plane of the objective optical system.

As shown in FIG. 15, for example, a second modification may be provided with a drive mechanism (illumination-system drive mechanism, not shown) that changes the inclination angle of the LED light source 7. By doing so, as shown in FIG. 16, it is possible to change the light intensity distribution on the diffusion plate 9. With this configuration, as shown in FIG. 17, the image of the illumination light at the pupil plane of the objective optical system 4 is weak on the optical-axis side and strong on the pupil-end side, and thus, it is possible to improve the contrast of the image of the specimen X.

Third Embodiment

Next, an observation apparatus according to a third embodiment of the present invention will be described below with reference to the drawings.

Figure 18:
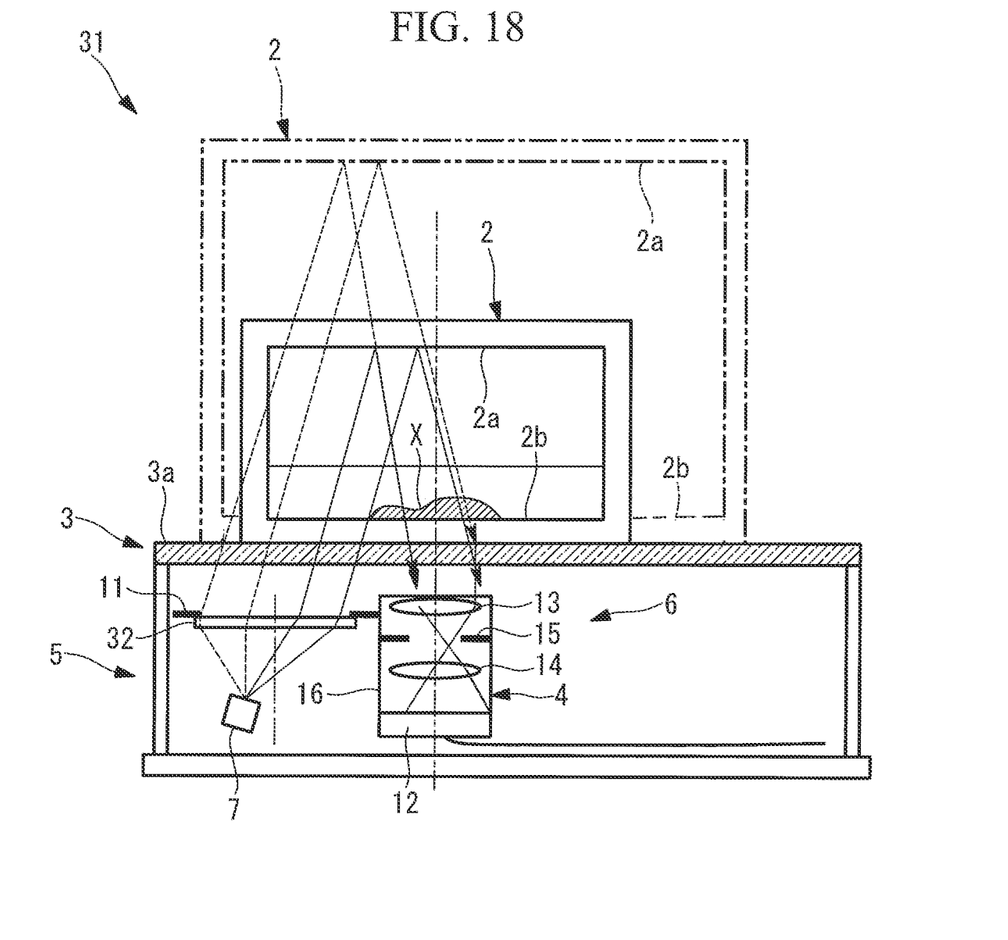
FIG. 18 is a longitudinal cross-sectional view of an observation apparatus according to a third embodiment of the present invention.

As shown in FIG. 18, an observation apparatus 31 according to this embodiment differs from that in the first embodiment in that, instead of the light-collecting lens 8 and the diffusion plate 9, a Fresnel lens 32 equipped with a diffusion function is employed as a light-collecting lens and a diffusion plate.

In the description of this embodiment, parts having the same configuration as those in the observation apparatus 1 according to the first embodiment and the observation apparatus 21 according to the second embodiment will be assigned the same reference signs, and descriptions thereof will be omitted.

Figure 19:
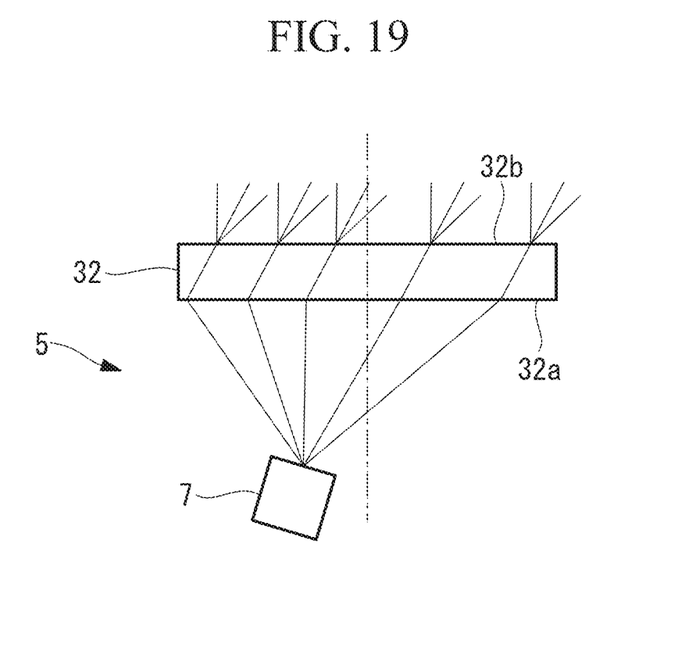
FIG. 19 is an enlarged view of the periphery of a Fresnel lens of the observation apparatus in FIG. 18.

As shown in FIG. 19, the Fresnel lens 32 equipped with a diffusion function has a Fresnel lens surface 32a on the LED light source 7 side and a diffusion surface (grain or the like) 32b on the specimen X side.

The illumination light emitted from the diffusion surface 32b of the Fresnel lens 32 has an angular distribution. With this configuration, the illumination light flux enters the pupil plane of the objective optical system 4 in the form of a plane instead of a point, and thus, it is possible to enhance the robustness against angle variations at the top plate 2a of the container 2. The diffusion surface 32b is provided with the illumination mask 11 that limits the emission region for emitting the illumination light from the LED light source 7.

The LED light source 7 is positioned in such a manner that the optical axis thereof is tilted toward the image-capturing optical system 6, and so that the optical axis thereof is shifted from the optical axis of the light-collecting lens 8 in the direction away from the objective optical system 4. It is desirable that the position of the LED light source 7 satisfy the abovementioned Conditional Expression (1).

With the observation apparatus 31 according to this embodiment, by employing the Fresnel lens 32 as the light-collecting lens, it is possible to reduce the thickness of the entire light source portion 5. Furthermore, because the diffusion plate is formed integrally with the Fresnel lens 32, the diffusion plate and the Fresnel lens 32 are not separated from each other in the optical axis direction, and thus, it is possible to further reduce the thickness of the entire light source portion 5 by a corresponding amount. Note that the problem in a case in which the position of the LED light source 7 does not satisfy the abovementioned Conditional Expression (1) is the same as that in the case in which the abovementioned Conditional Expression (1) is not satisfied in the first embodiment.

In this embodiment, similarly to the first modification of the second embodiment, a drive mechanism that moves the LED light source 7 in a horizontal direction may be employed, or similarly to the second modification of the second embodiment, a drive mechanism that changes the inclination angle of the LED light source 7 may be employed. In this case also, it is possible to obtain the same effects as in the first modification and the second modification of the second embodiment.

Although the embodiments of the present invention have been described above with reference to the drawings, the specific configuration is not limited to these embodiments, and design modifications and so forth that do not depart from the scope of the present invention are also encompassed. For example, the present invention is not limited to being applied to the abovementioned embodiments and modifications and may be applied to embodiments formed by appropriately combining these embodiments and modifications, without particular limitation. In addition, for example, although the LED light source 7 has been described as an example of the light source, the light source is not limited thereto. For example, a planar light source, such as organic EL, may be employed.

In addition, for example, although the specimen X is accommodated in the container 2 having the top plate 2a, such as a cell culturing flask, and the illumination light is Fresnel-reflected at the inner surface of the top plate 2a of the container 2 in the abovementioned embodiments, the present invention is not limited thereto. For example, in a case in which the specimen X is accommodated in a container like a petri dish (without a lid) that does not have the top plate 2a, a reflection member, such as a mirror, may be disposed at a position where the reflection member closes an upper opening of the petri dish, and the illumination light that has passed through the bottom surface of the petri dish, in an upward direction, may be reflected by one surface of this reflection member. The reflection member may be provided, at a position above the specimen X, so as to be attachable/detachable by means of a linear motion or pivoting motion.

In addition, in a case in which the specimen X is accommodated in a container like a petri dish (without a lid) that does not have the top plate 2a, a solution (for example, a culture medium, phosphate buffer, etc.) may be placed in the petri dish, the specimen X may be immersed in the solution, and the illumination light that has passed through the bottom surface of the petri dish, in an upward direction, may be reflected by the liquid surface at an upper part of the solution. Also in a case in which the specimen X is accommodated in the container 2 having the top plate 2a, a solution (for example, a culture medium, phosphate buffer, etc.) may be placed in the container 2 and the specimen X may be immersed in the solution. In these modifications, instead of the height of the top plate 2a of the container 2, the height of the one surface of the reflection member or the height of the liquid surface at the upper part of the solution may be applied to the abovementioned Conditional Expressions.

The above-described embodiment also leads to the following invention.

An aspect of the present invention is an observation apparatus provided with: a light source portion that emits illumination light in an upward direction from below a specimen placed on a specimen placement surface; and an image-capturing optical system that captures, below the specimen, transmitted light, which is the illumination light that has been emitted from the light source portion, reflected above the specimen, and transmitted through the specimen, wherein the light source portion is provided with: a light source that generates the illumination light; a light-collecting lens that is disposed parallel to the specimen placement surface and that collects the illumination light emitted from the light source; and a diffusion plate that is disposed between the light-collecting lens and the specimen placement surface, parallel to the specimen placement surface, and that diffuses the illumination light collected by the light-collecting lens, and wherein the light source is positioned so that an optical axis thereof is shifted from an optical axis of the light-collecting lens in a direction away from the image-capturing optical system.

With this aspect, by positioning the light source so that the optical axis thereof is shifted from the optical axis of the light-collecting lens in the direction away from the image-capturing optical system, the illumination light emitted from the light source is uniformly diffused by the diffusion plate via the light-collecting lens, and after being reflected above the specimen, the light passes through the specimen and is made incident, with an angle, on the image-capturing optical system.

Therefore, it is possible to efficiently illuminate the specimen at an oblique illumination angle that allows a stereoscopic view of the specimen. In addition, it suffices that one each of the light-collecting lens and the diffusion plate be provided, and it is possible to suppress the occurrence of nonuniformity in light intensity. Furthermore, by arranging the specimen placement surface, the light-collecting lens, and the diffusion plate so as to be parallel to each other, it is possible to reduce the thickness of the apparatus. By doing so, it is possible to efficiently illuminate the specimen and to observe the specimen in a stereoscopic and highly precise manner by means of oblique illumination, without increasing the size of the apparatus.

In the abovementioned aspect, the light source may be disposed in such a manner that the optical axis thereof is tilted toward the image-capturing optical system.

With this configuration, the illumination light is emitted from the light source toward the image-capturing optical system more intensely, and it is possible to suppress the loss of the illumination light, thereby enhancing the illumination efficiency.

In the abovementioned aspect, the light-collecting lens may be a Fresnel lens.

By employing a Fresnel lens as the light-collecting lens, it is possible to reduce the thickness of the entire light source portion.

In the abovementioned aspect, the diffusion plate may be formed integrally with the Fresnel lens.

With this configuration, since the diffusion plate and the Fresnel lens are not separated from each other in the optical axis direction, it is possible to reduce the thickness of the entire light source portion by a corresponding amount.

In the abovementioned aspect, the angular distribution of the illumination light emitted from the diffusion plate may satisfy the following conditions:

$$\theta min/NA < 0.5$$

$$\theta max/NA > 2.0$$

where NA is the numerical aperture of an objective optical system; $\theta$ min is the minimum value of an angle, relative to an optical axis of the objective optical system, at which the intensity is at least half the peak intensity of the illumination light diffused by the diffusion plate; and $\theta$ max is the maximum value of the angle, relative to the optical axis of the objective optical system, at which the intensity is at least half the peak intensity of the illumination light diffused by the diffusion plate.

With this configuration, it is possible to efficiently emit the illumination light at an optimum oblique illumination angle for the image-capturing optical system, and to prevent the occurrence of illumination nonuniformity.

In the abovementioned aspect, the following condition may be satisfied:

$$0.5 < \Delta Y/(NA \times Fl) < 1.5$$

where $\Delta Y$ is the center position of a light-emitting region of the light source with respect to the optical axis of the light-collecting lens; NA is the numerical aperture of an objective optical system; and Fl is the focal distance of the light-collecting lens.

With this configuration, it is possible to efficiently emit the illumination light at an optimum oblique illumination angle for the image-capturing optical system, and to prevent the occurrence of illumination nonuniformity.

In the abovementioned aspect, the light source may be an LED.

With this configuration, it is possible to perform lighting control of the light source.

REFERENCE SIGNS LIST 1, 21, 31 observation apparatus
2 container
2a top plate
5 light source portion
6 image-capturing optical system
7 LED light source
8 light-collecting lens
9 diffusion plate
32 Fresnel lens
X specimen

The invention claimed is:

1. An observation apparatus comprising:
a stage on which a container is mounted, the container having a specimen placement surface on which a specimen is placed;
a light source that generates illumination light emitted in an upward direction from below the specimen;
a light-collecting lens that is disposed parallel to the specimen placement surface and that collects the illumination light emitted from the light source;
a diffusion plate that is disposed between the light-collecting lens and the specimen placement surface, parallel to the specimen placement surface, and that diffuses the illumination light collected by the light-collecting lens;
an objective optical system that is disposed below the stage, the objective optical system having at least one lens configured to collect light passing through the stage from thereabove; and
a reflection surface that is disposed above the specimen and that reflects the illumination light emitted in the upward direction from below the specimen;
wherein the light source is positioned so that an optical axis thereof is shifted from an optical axis of the light-collecting lens in a direction away from the objective optical system.

2. The observation apparatus according to claim 1, wherein the light source is disposed in such a manner that the optical axis thereof is tilted toward the objective optical system.

3. The observation apparatus according to claim 1, wherein the light-collecting lens is a Fresnel lens.

4. The observation apparatus according to claim 3, wherein the diffusion plate is formed integrally with the Fresnel lens.

5. The observation apparatus according to claim 1, wherein an angular distribution of the illumination light emitted from the diffusion plate satisfies the following conditions:

$$\theta min/NA < 0.5$$

$$\theta max/NA > 2.0$$

where NA is a numerical aperture of the objective optical system; $\theta min$ is a minimum value of an angle, relative to an optical axis of the objective optical system; and $\theta max$ is a maximum value of the angle, relative to the optical axis of the objective optical system.

6. An observation apparatus according to claim 1, wherein the following condition is satisfied:

$$0.5 < \Delta Y/(NA \times FI) < 1.5$$

where $\Delta Y$ is a distance between a center position of a light-emitting region of the light source and the optical axis of the light-collecting lens; NA is a numerical aperture of the objective optical system; and FI is a focal distance of the light-collecting lens.

7. An observation apparatus according to claim 1, wherein the light source is an LED.

8. The observation apparatus according to claim 1, wherein the reflection surface comprises an inner surface of a top plate of the container.

9. The observation apparatus according to claim 1, wherein the reflection surface comprises a mirror.

10. The observation apparatus according to claim 1, wherein the reflection surface comprises a liquid surface of a solution in the container.

* * * * *